United States Patent [19]

Kung

[11] Patent Number: 5,097,752
[45] Date of Patent: Mar. 24, 1992

[54] TIMING ASCENDING APPARATUS FOR A FRYING MACHINE

[76] Inventor: Kuo-Lang Kung, No. 121, Lan-Chou San St., Chiayi City, Taiwan

[21] Appl. No.: 749,291

[22] Filed: Aug. 23, 1991

[51] Int. Cl.$^5$ .............................. A47J 29/12
[52] U.S. Cl. ........................ 99/336; 99/403; 99/407; 99/410
[58] Field of Search ............... 99/327, 330, 331, 355, 99/334–336, 403, 404, 407, 408, 410–414, 416, 417, 443 R

[56] References Cited

U.S. PATENT DOCUMENTS

| | | | |
|---|---|---|---|
| 2,215,929 | 9/1940 | Husk | 99/407 X |
| 2,766,680 | 10/1956 | Tagliaferri | 99/336 X |
| 2,903,958 | 9/1959 | St. Laurent | 99/336 |
| 2,915,000 | 12/1959 | Hetzel et al. | 99/327 |
| 3,078,786 | 2/1963 | Arvan | 99/407 |
| 3,364,845 | 1/1968 | Wilson et al. | 99/336 |
| 3,690,246 | 9/1972 | Guthrie, Sr. | 99/407 |
| 3,821,925 | 7/1974 | Moore | 99/327 |
| 4,287,818 | 9/1981 | Moore et al. | 99/416 |
| 4,852,471 | 8/1989 | Lansing | 99/330 |
| 4,951,558 | 8/1990 | Figliuzzi | 99/410 |

FOREIGN PATENT DOCUMENTS

| | | | |
|---|---|---|---|
| 3221433 | 12/1983 | Fed. Rep. of Germany | 99/336 |
| 602073 | 7/1978 | Switzerland | 99/336 |

Primary Examiner—Timothy F. Simone
Attorney, Agent, or Firm—Ladas & Parry

[57] ABSTRACT

A timing ascending apparatus for a frying machine includes a timer unit, a control rod assembly with a control hook, and an ascending rod assembly with a positioning hook. A horizontal net is carried on the ascending rod of the ascending rod assembly. A transverse actuator rod connects rotatably the positioning hook to the ascending rod. When a frying time is set by rotating the rotary button of the timer unit and the transverse actuator rod is depressed until the positioning hook catches the control hook, the horizontal net is moved from an upper limit position to a lower limit position. Depression of the transverse actuator rod compresses the coiled piston spring of a restoration device. The upper limit position is in the top portion of an oil tank somewhat above the cooking oil surface, while the lower limit position is in the bottom portion of the oil tank. When reaching the frying time or by rotating the transverse actuator rod in a direction, the positioning hook and the control hook separate from each other, so that the compressed piston spring activates the horizontal net to move to the upper limit position.

3 Claims, 8 Drawing Sheets

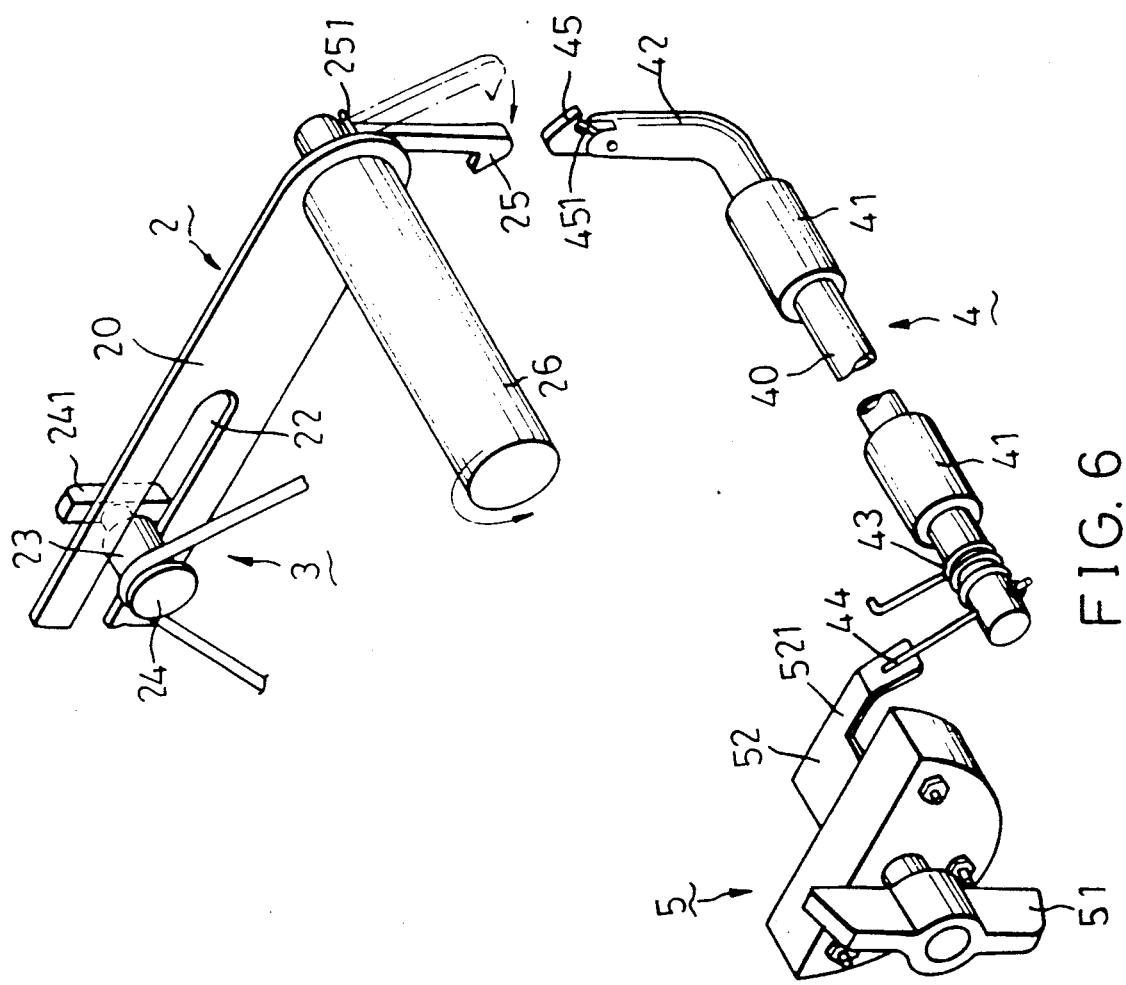

TIMING ASCENDING APPARATUS FOR A FRYING MACHINE

BACKGROUND OF THE INVENTION

1. Field of the Invention

This invention relates to an ascending apparatus, more particularly to a timing ascending apparatus for a frying machine.

2. Description of the Related Art

Referring to FIG. 1, when we desire to fry masses of stuff, cooking oil (A1) is poured into a wok (A) which is placed on a gas burner (B). Then, the masses of stuff are put in the cooking oil (A1) in the wok (A). When the cooking oil (A1) is heated for a period sufficient to fry the masses of stuff, the temperature is around 230 degrees centigrade in the top portion of the wok (A), and 200 degrees centigrade in the bottom portion of the wok (A). This range of temperature causes the cooking oil (A1) to degenerate. Furthermore, because only the bottom portion of the wok (A) is heated, the heat absorption efficiency is lowered. A frying machine shown in FIGS. 2 and 3 is therefore developed to diminish these disadvantages. As illustrated, the frying machine includes an oil tank (C), several heating pipes (D), an exhaust pipe (E) and a gas heater (F). The oil tank (C) has a rectangular top end and a funnel-like bottom end on which a valve (C1) is installed to discharge cooking oil (C2) from the oil tank (C). The heating pipes (D) extend through the middle portion of the oil tank (C) so that heated hot air from the heater (f) flows therethrough, thus heating the cooking oil (C2). To solve the above-mentioned overheating and oil degeneration problem, a temperature control device is provided in the machine to control the burning of the heater (F) so as to keep the temperature of the cooking oil (C2) in the top portion of the oil tank (C) within the range of about 180 to 200 degrees centigrade. The masses of stuff are taken from the oil tank (C) at an appropriate time. Since the masses of stuff may be fried for too long a period due to an oversight of the operator, a timing and alarm device is used to set the frying time and signals the operator when to take the fried masses of stuff from the oil tank (C). However, an emergency may cause the operator to be unable to remove the masses of stuff immediately after hearing the signal of the timing and alarm device, thus rendering the masses of stuff scorched.

SUMMARY OF THE INVENTION

It is therefore the main object of the invention to provide a timing ascending apparatus for a frying machine.

According to this invention, a timing ascending apparatus for a frying machine includes a timer unit, a control rod assembly with a control hook, and an ascending rod assembly with a positioning hook. A horizontal net is carried on the ascending rod of the ascending rod assembly. A transverse actuator rod connects rotatably the positioning hook to the ascending rod. When a frying time is set by rotating the rotary button of the timer unit and the transverse actuator rod is depressed until the positioning hook catches the control hook, the horizontal net is moved from an upper limit position to a lower limit position. Depression of the transverse actuator rod compresses the coiled piston spring of a restoration device. The upper limit position is in the top portion of an oil tank somewhat above the cooking oil surface, while the lower limit position is in the bottom portion of the oil tank. When reaching the frying time or by rotating the transverse actuator rod in a direction, the positioning hook and the control hook separate from each other, so that the compressed piston spring activates the horizontal net to move to the upper limit position.

BRIEF DESCRIPTION OF THE DRAWING

Other features and advantages of this invention will become apparent in the following detailed description of a preferred embodiment of this invention, with reference to the accompanying drawings, in which:

FIG. 6 is a perspective view showing the connection of the timer unit, the control rod assembly and the ascending rod assembly of the timing ascending apparatus according to this invention;

DETAILED DESCRIPTION OF THE PREFERRED EMBODIMENT

Figure 4:
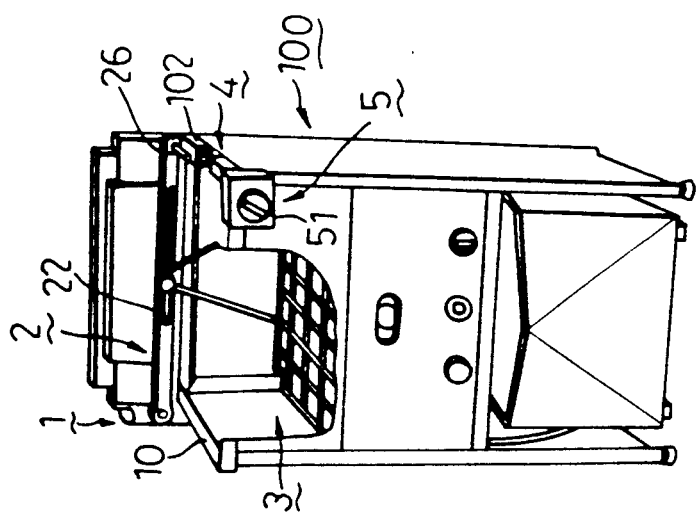
FIG. 4 is a schematic view showing a frying machine equipped with a timing ascending apparatus of this invention.

Referring to FIG. 4, a timing apparatus of this invention includes a restoration device 1, an ascending rod assembly 2, a net unit 3, a control rod assembly 4 and a timer unit 5.

Referring to FIG. 6, the timer unit 5 includes a rotary button 51 rotatable to preset a frying time after which the rotary button 51 rotates back to a normal position, and a driving body 52 connected securely to the rotary button 51. The driving body 52 is integrally formed with a radially extending driving rotary arm 521.

Figure 8A:
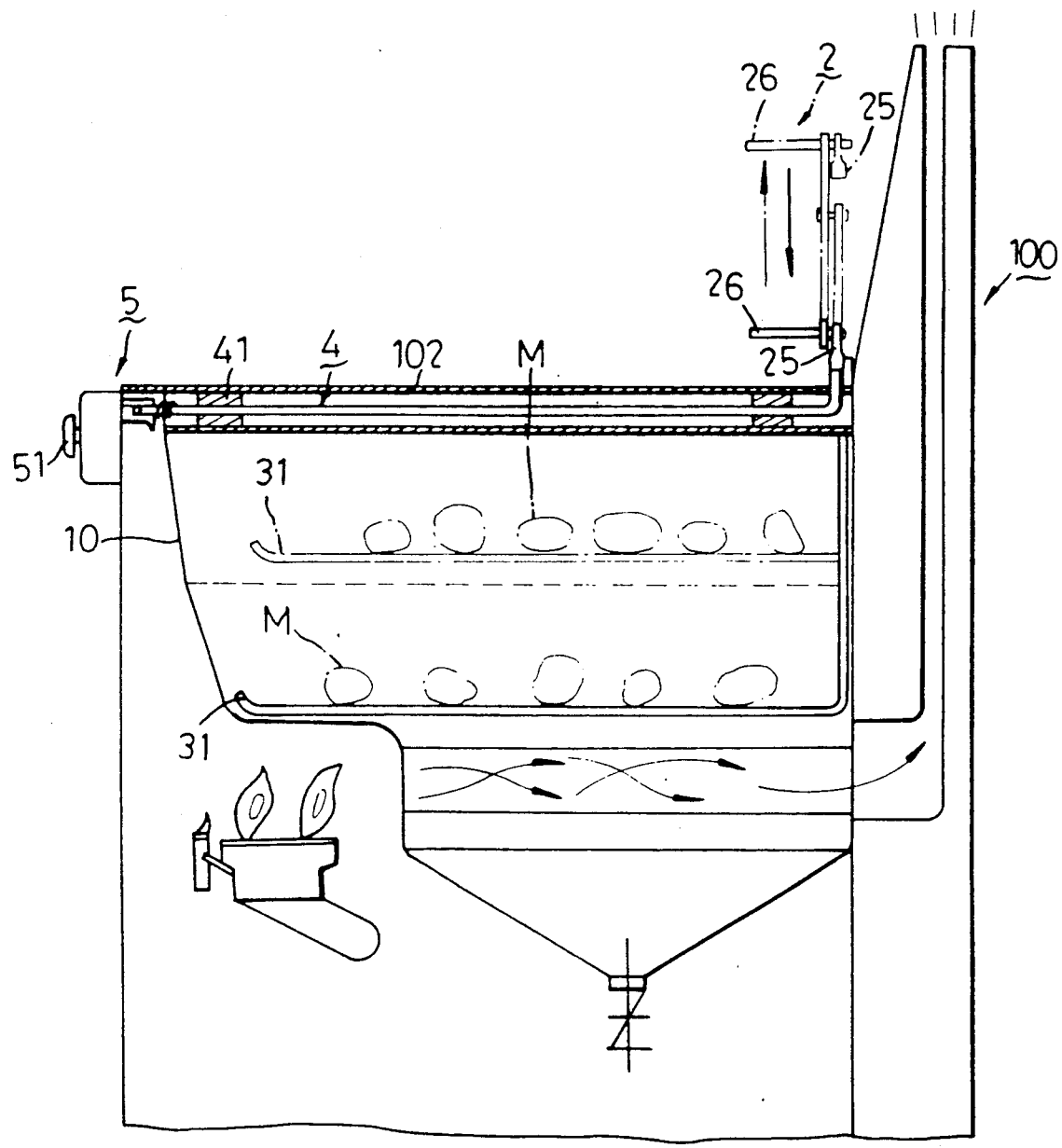
FIG. 8A is a schematic view illustrating the movement of the transverse actuator rod and the horizontal net of the timing ascending apparatus according to this invention.

The control rod assembly 4 includes a horizontal control rod 40 journalled in the machine 100 by two bearings 41, a vertical control arm 42 connected securely to the rear end of the control rod 40, an arm spring 43 biasing the control rod 40 to rotate counterclockwise, a radially extending driven rotary arm 44 connected securely to the front end of the control rod 40 and biased by the arm spring 43 to press against the driving rotary arm 521, a control hook 45 connected pivotally to the upper end of the control arm 42 and having a back-curving upper end portion with an inclined top surface. and a lower hook spring 451 biasing the control hook 45 to rotate clockwise. As best shown in FIGS. 4 and 8A, the control rod 40 is disposed in a rectangular protective tube 102 which is provided on the top end of the right side wall of an oil tank 10.

The restoration device 1 (see FIG. 5) is disposed behind the oil tank 10 and includes a hydraulic cylinder body 11, a piston unit 12 dividing the interior of the cylinder body 11 into two oil chambers, a resilient body or coiled piston spring 13 biasing the piston unit 12 to move upward, a rack 121 secured to the piston unit 12, and a pinion 14 sleeved rigidly on a driven shaft 141. Because the pinion 14 meshes with the rack 121, the longitudinal movement of the piston unit 12 and the rack 121 is converted into the rotation of the pinion 14 and the driven shaft 141. As a consequence, the piston spring 13 biases the driven shaft 141 to rotate to a static position. The front end of the driven shaft 141 has an externally splined portion 142.

Figure 1:
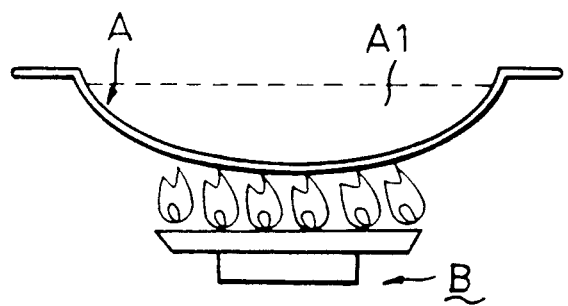
FIG. 1 is a schematic view illustrating the manner in which a common family fries something.
Figure 2:
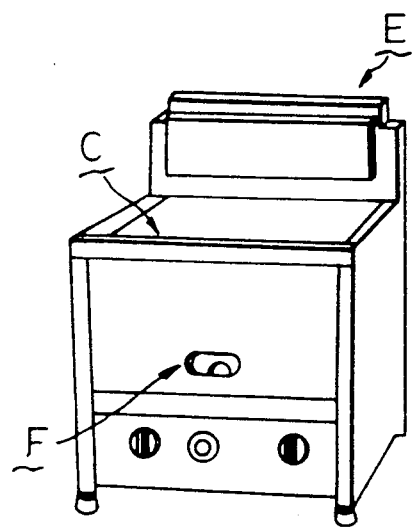
FIG. 2 is a schematic view showing the outer appearance of a conventional frying machine.
Figure 3:
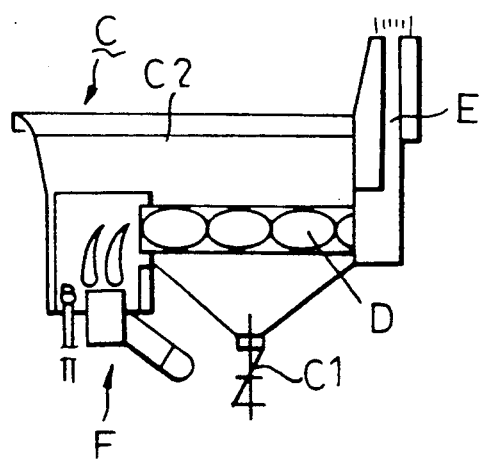
FIG. 3 is a schematic view illustrating the internal structure of the conventional frying machine.
Figure 5:
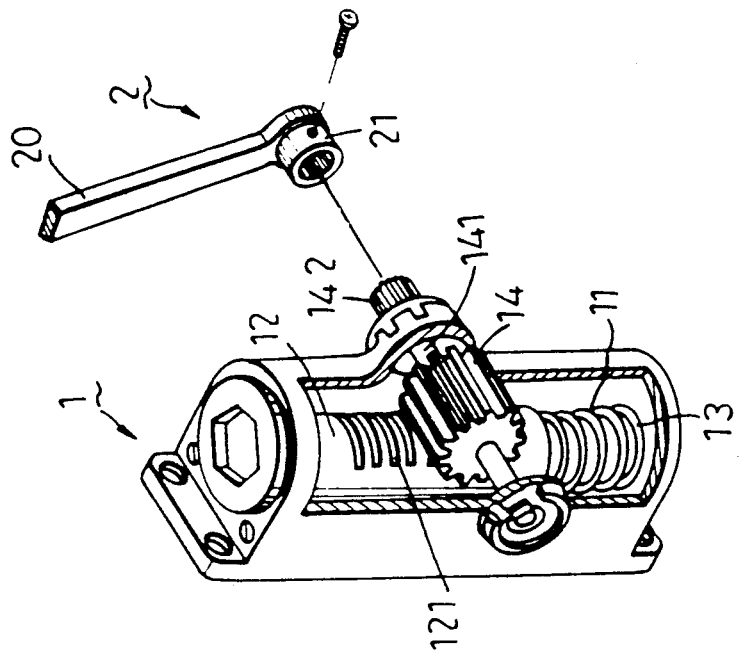
FIG. 5 is a schematic view showing the restoration device of the timing ascending apparatus according to this invention.

Referring to FIGS. 4, 5 and 6, the ascending rod assembly 2 includes an ascending rod 20 provided with an internally splined sleeve 21 at the left end thereof so as to engage with the externally splined portion 142 of the driven shaft 141. As illustrated, the sleeve 21 is locked on the driven shaft 141 by a lock bolt. A lengthwise slide slot 22 is formed through the intermediate portion of the ascending rod 20 so as to receive slidably a sliding rod 23 therein. The sliding rod 23 is provided with a circular blocking element 24 at the front end thereof, and a rectangular blocking element 241 at the rear end of the sliding rod 23, so as to retain the sliding rod 23 in the slide slot 22. A positioning hook 25 is secured to the rear end of a transverse actuator rod 26 which is mounted rotatably on the right end of the ascending rod 20. An upper hook spring 251 interconnects the transverse actuator rod 26 and the ascending rod 20 so as to bias the positioning hook 25 to rotate clockwise. The positioning hook 25 includes a vertical body and a back-curving lower end which has an inclined bottom surface.

Figure 7:
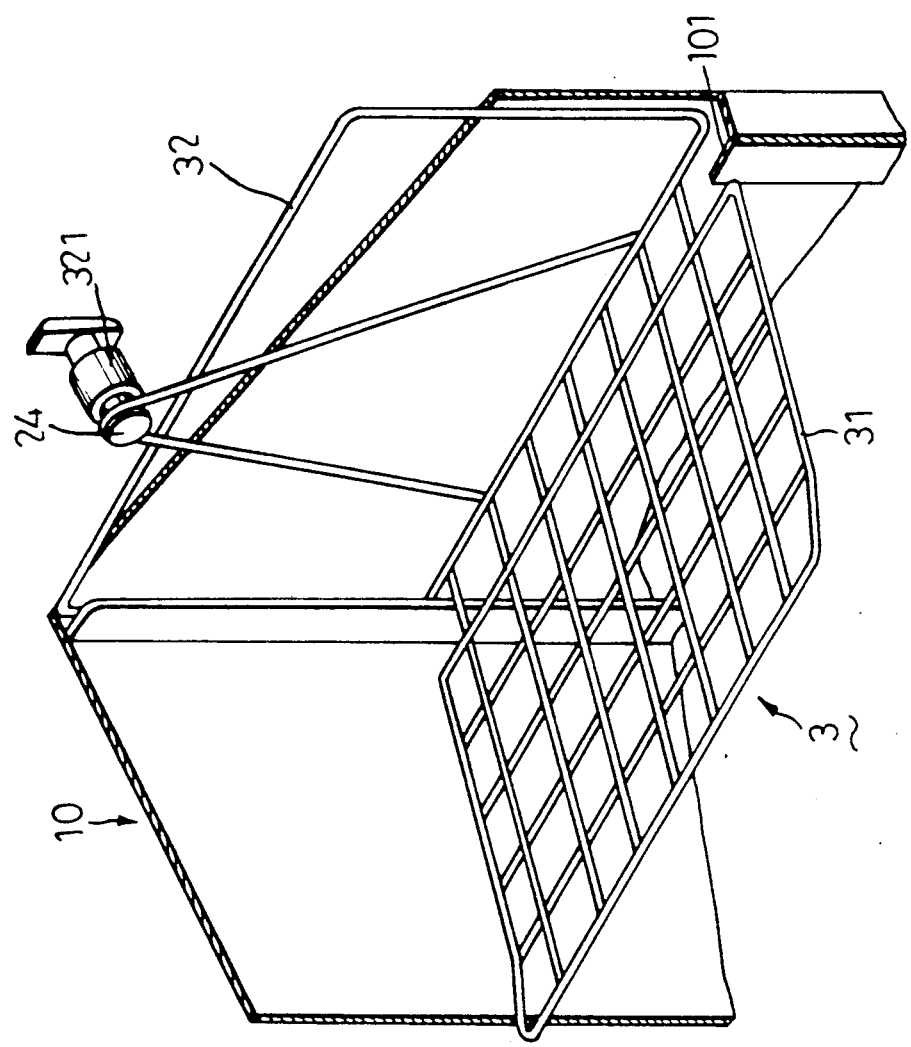
FIG. 7 is a schematic view illustrating how to guide the net unit of the timing ascending apparatus to move up and down in accordance with this invention.

Referring to FIG. 7, the net unit 3 is attached to the sliding rod 23 at the upper end thereof and includes a horizontal net 31 for supporting masses of stuff to be fried thereon, and a vertical rectangular frame 32 which is slidable vertically along two vertical guide slots 101 in the oil tank 10.

With the restoration device 1 consisting of a hydraulic cylinder, the movement of the horizontal net 31 is slow.

Figure 8B:
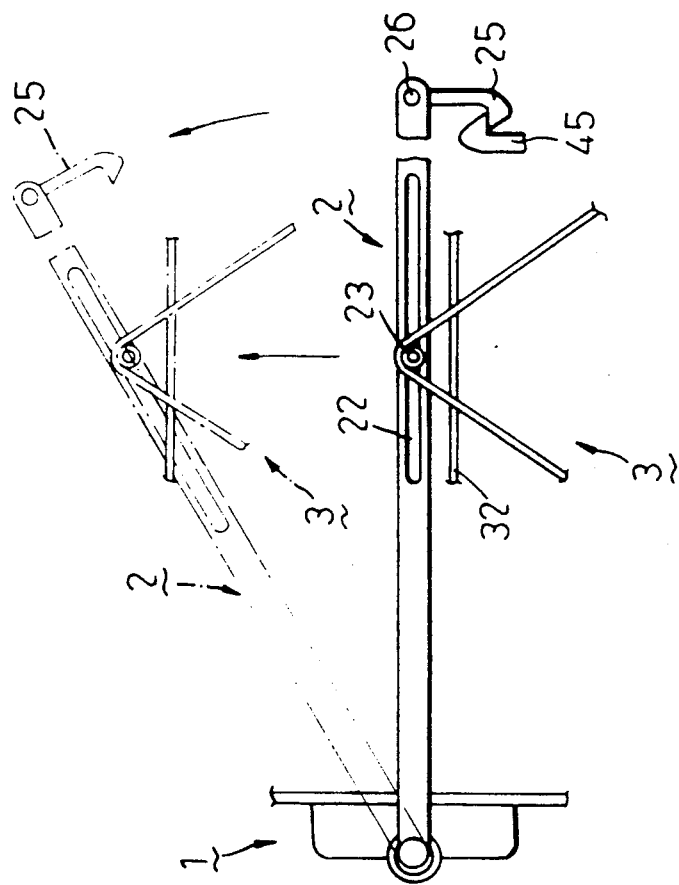
FIG. 8B is a schematic view illustrating the movement of the ascending rod of the timing ascending apparatus according to this invention.
Figure 9A:
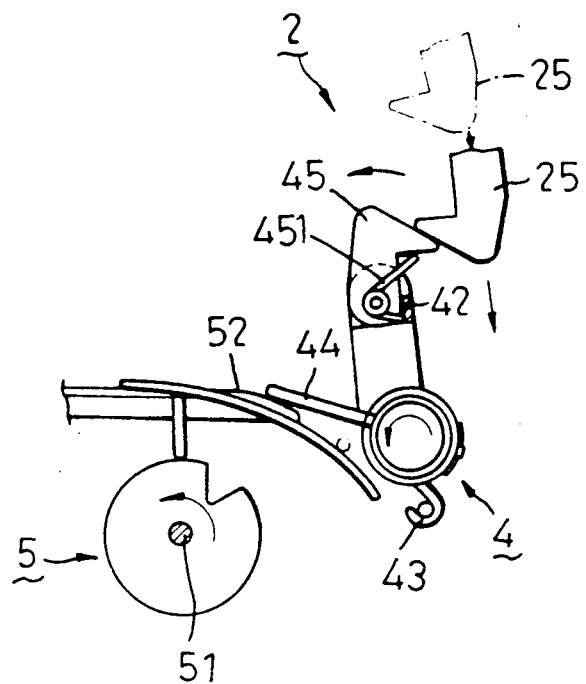
FIGS. 9A, 9B and 9C are schematic views illustrating the movement of the positioning hook and the control hook of the timing ascending apparatus according to this invention.
Figure 9B:
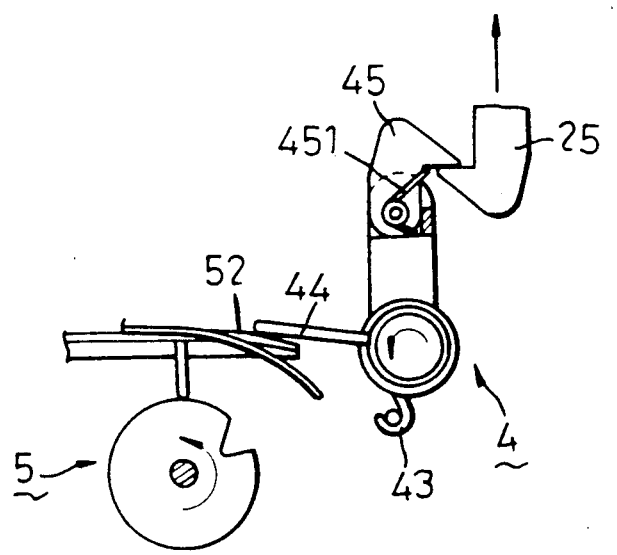
Figure 9C:
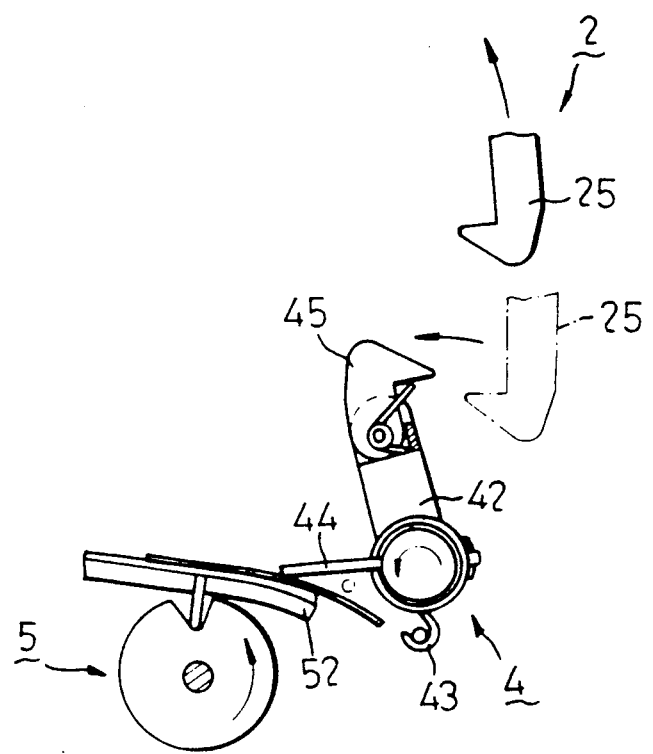

In the timing frying operation of self-stopping, referring to FIG. 8A, masses (M) of stuff are put on the horizontal net 31 which is in its upper limit position somewhat above the oil surface in the top portion of the oil tank 10, as indicated by dotted lines, and the piston unit 12 is also in its upper limit position. At this time, the ascending rod 20 is in an inclined position, as indicated by dotted lines in FIG. 8B, where the positioning hook 25 is spaced apart from the control hook 45. The frying time is set by rotating the rotary button 51 to a selected position. The driven rotary arm 44 is impelled by the driving rotary arm 521 so as to rotate the control rod 40 to a certain angle. The transverse actuator rod 26 is then depressed to move downward from its upper limit position (as indicated by dotted lines in FIG. 8A) to its lower limit position (as indicated by solid lines in FIG. 8A), so as to move the positioning hook 25 downward. When the positioning hook 25 contacts the control hook 45, the inclined bottom surface of the positioning hook 25 slides over the inclined top surface of the control hook 45. Then, the positioning hook 25 and the control hook 45 catch each other with the assistance of the upper hook spring 251 and the lower hook spring 451, so as to position the transverse actuator rod 26 and the horizontal net 31 in their lower limit position, where the ascending rod 20 is in a horizontal position. The lower limit position of the horizontal net 31 is in the bottom portion of the oil tank 10. At the same time, the rotation of the ascending rod 20 and the driven shaft 141 moves the piston unit 12 downward so as to compress the piston spring 13.

When reaching the preset frying time, the rotary button 51 rotates back to its normal position, so as to enable the arm spring 43 to rotate the control rod 40 counterclockwise to its static position, thereby separating the control hook 45 from the positioning hook 25. Then, the compressed piston spring 13 moves the piston unit 12 upward. Because the rack 121 meshes with the pinion 14, the upward movement of the piston unit 12 is converted into the rotation of the driven shaft 141, so as to turn the ascending rod 20 upward, thereby moving the horizontal net 31 to its upper limit position. Accordingly, the masses (M) of stuff are removed from the cooking oil.

In the manual operation, masses (M) of stuff are put on the horizontal net 31 which is in its upper limit position. The rotary button 51 is rotated to a predetermined position, so that the driving rotary arm 521 impels the driven rotary arm 44, thereby rotating the control rod 40 to a predetermined angle. The transverse actuator rod 26 is depressed until the positioning hook 25 catches the control hook 45, so as to move the horizontal net 31 to its lower limit position. When the masses (M) of stuff are fried to a satisfactory extent, the operator rotates the transverse actuator rod 26 counterclockwise so as to separate the positioning hook 25 from the control hook 45, thereby ascending the horizontal net 31 slowly. The rotary button 51 is then rotated back to its normal position.

With this invention thus explained, it is apparent that numerous modifications and variations can be made without departing from the scope and spirit of this invention. It is therefore intended that this invention be limited only as indicated in the appended claims.

I claim:

1. A timing ascending apparatus for a frying machine, said frying machine including an oil tank disposed therein, said timing ascending apparatus comprising:

a timer unit including a rotary button rotatable to preset a frying time after which said rotary button rotates back to a normal position, and a driving body connected securely to said rotary button and having a radially extending driving rotary arm;

a control rod assembly including a horizontal control rod journalled in said machine, a radially extending driven rotary arm connected securely to an end of said control rod at an end thereof and abutting against said driving rotary arm at the other end of said driven rotary arm, an arm spring biasing said driven rotary arm to press against said driving rotary arm, a vertical control arm connected securely to the other end of said control rod, and a control hook connected pivotally to an upper end of said control arm and having a back-curving upper end portion with an inclined top surface;

a restoration device disposed behind said oil tank and including a driven shaft mounted rotatably on said machine, and a resilient body biasing said driven shaft to rotate to a static position;

an ascending rod assembly including an ascending rod secured to said driven shaft and extending radially from said driven shaft, a lengthwise slide slot formed through an intermediate portion of said ascending rod, a transverse actuator rod mounted rotatably on the other end of said ascending rod, and a positioning hook secured to said transverse actuator rod at an upper end thereof and having a vertical body and a back-curving lower end with an inclined bottom surface;

an upper hook spring interconnecting said transverse actuator rod and said ascending rod so as to bias said positioning hook to catch said control hook;

a lower hook spring interconnecting said control hook and said control rod so as to bias said control hook to catch said positioning hook;

a net unit having an upper end slidable along said slide slot of said ascending rod and including a horizontal net disposed at a lower end thereof and positioned in a bottom portion of said oil tank when said positioning hook catches said control hook, said horizontal net being adapted to support masses of stuff to be fried thereon; and a guide mechanism guiding said horizontal net to move vertically in said oil tank between an upper limit position which is in a top end portion of said oil tank, and a lower limit position, where said positioning hook and said control hook latch each other;

whereby when said transverse actuator rod is manually rotated to separate said positioning hook from said control hook, said resilient body rotates said driven shaft to the static position so as to turn said ascending rod up, thereby moving said horizontal net to the upper limit position; when said frying time preset is reached so as to rotate said rotary button to the normal position, said arm spring rotates said control rod to separate said control hook from said positioning hook so as to move said horizontal net to the upper limit position; when said horizontal net is in the upper limit position, said transverse actuator rod can be depressed manually so that the inclined bottom surface of said positioning hook slides over the inclined top surface of said control hook, thereby enabling said positioning hook to catch said control hook, depression of said transverse actuator rod turning said ascending rod downward so as to rotate said driven shaft, thereby compressing said resilient body.

2. A timing ascending apparatus as claimed in claim 1, wherein said restoration device includes:
   a hydraulic cylinder body;
   a piston unit mounted slidably in said cylinder body;
   a rack carried on said piston unit;
   a pinion sleeved rigidly on said driven shaft and meshing with said rack, depression of said transverse actuator rod turning said ascending rod downward so as to rotate said driven shaft and said pinion, thus moving said rack and piston unit in a direction; and
   a piston spring disposed in said cylinder body so as to bias said piston unit to move in the opposite direction;
   whereby in a case where said horizontal net is at the lower limit position and said ascending rod is in a horizontal position, when said positioning hook and said control hook separate from each other so that said piston spring moves said piston unit and said rack in said cylinder body, said pinion and said driven shaft rotate so as to turn said ascending rod upward, thereby moving said horizontal net to the upper limit position.

3. A timing ascending apparatus as claimed in claim 1, wherein said oil tank has two aligned vertical guide slots formed therein, said net unit including a vertical frame having two opposite sides which are disposed slidably within said guide slots, said guide slots and said vertical frame constituting said guide mechanism, whereby said horizontal net is guided to move up and down.

* * * * *